(12) United States Patent
Morrison (10) Patent No.: US 9,442,607 B2
(45) Date of Patent: Sep. 13, 2016

(54) INTERACTIVE INPUT SYSTEM AND METHOD

(75) Inventor: Gerald Morrison, Calgary (CA)

(73) Assignee: SMART TECHNOLOGIES Inc., Calgary (CA)

( * ) Notice: Subject to any disclaimer, the term of this patent is extended or adjusted under 35 U.S.C. 154(b) by 1453 days.

(21) Appl. No.: 11/566,515

(22) Filed: Dec. 4, 2006

(65) Prior Publication Data

US 2008/0129700 A1   Jun. 5, 2008

(51) Int. Cl.
*G06F 3/041* (2006.01)
*G06F 3/042* (2006.01)

(52) U.S. Cl.
CPC .................. *G06F 3/0428* (2013.01)

(58) Field of Classification Search
CPC .. G06F 3/0421; G06F 3/0425; G06F 3/0426; G06F 3/0428
USPC ................................ 345/156–179; 178/18.09
See application file for complete search history.

(56) References Cited

U.S. PATENT DOCUMENTS

| | | |
|---|---|---|
| 2,769,374 A | 11/1956 | Sick |
| 3,025,406 A | 3/1962 | Stewart et al. |
| 3,128,340 A | 4/1964 | Harmon |
| 3,187,185 A | 6/1965 | Milnes |
| 3,360,654 A | 12/1967 | Muller |
| 3,478,220 A | 11/1969 | Milroy |
| 3,613,066 A | 10/1971 | Cooreman |
| 3,764,813 A | 10/1973 | Clement et al. |
| 3,775,560 A | 11/1973 | Ebeling et al. |
| 3,857,022 A | 12/1974 | Rebane et al. |
| 3,860,754 A | 1/1975 | Johnson et al. |
| 4,107,522 A | 8/1978 | Walter |
| 4,144,449 A | 3/1979 | Funk et al. |
| 4,243,879 A | 1/1981 | Carroll et al. |
| 4,247,767 A | 1/1981 | O'Brien et al. |
| 4,420,261 A | 12/1983 | Barlow et al. |
| 4,459,476 A | 7/1984 | Weissmueller et al. |
| 4,468,694 A | 8/1984 | Edgar |
| 4,507,557 A * | 3/1985 | Tsikos ........................ 250/341.7 |
| 4,550,250 A | 10/1985 | Mueller et al. |
| 4,553,842 A | 11/1985 | Griffin |
| 4,558,313 A | 12/1985 | Garwin et al. |

(Continued)

FOREIGN PATENT DOCUMENTS

| | | |
|---|---|---|
| AU | 2003233728 A1 | 12/2003 |
| AU | 2006243730 A1 | 11/2006 |

(Continued)

OTHER PUBLICATIONS

Partial European Search Report for EP 03 25 7166 which was completed on May 19, 2006.

(Continued)

*Primary Examiner* — Alexander Eisen
*Assistant Examiner* — Nelson Lam
(74) *Attorney, Agent, or Firm* — Perkins Coie LLP (57) ABSTRACT

An interactive input system comprises imaging devices with different viewpoints and having at least partially overlapping fields of view encompassing a region of interest. At least two of the imaging devices have different focal lengths. Processing structure processes image data acquired by the imaging devices to detect the existence of a pointer and determine the location of the pointer within the region of interest.

30 Claims, 2 Drawing Sheets

(56) References Cited

U.S. PATENT DOCUMENTS

| | | | |
|---|---|---|---|
| 4,639,720 A | 1/1987 | Rympalski et al. |
| 4,672,364 A | 6/1987 | Lucas |
| 4,673,918 A | 6/1987 | Adler et al. |
| 4,703,316 A | 10/1987 | Sherbeck |
| 4,710,760 A | 12/1987 | Kasday |
| 4,737,631 A | 4/1988 | Sasaki et al. |
| 4,742,221 A | 5/1988 | Sasaki et al. |
| 4,746,770 A * | 5/1988 | McAvinney ............... 178/18.09 |
| 4,762,990 A | 8/1988 | Caswell et al. |
| 4,766,424 A | 8/1988 | Adler et al. |
| 4,782,328 A | 11/1988 | Denlinger |
| 4,811,004 A | 3/1989 | Person et al. |
| 4,818,826 A | 4/1989 | Kimura |
| 4,820,050 A | 4/1989 | Griffin |
| 4,822,145 A | 4/1989 | Staelin |
| 4,831,455 A | 5/1989 | Ishikawa et al. |
| 4,851,664 A | 7/1989 | Rieger |
| 4,868,551 A | 9/1989 | Arditty et al. |
| 4,868,912 A | 9/1989 | Doering |
| 4,888,479 A | 12/1989 | Tamaru |
| 4,893,120 A | 1/1990 | Doering et al. |
| 4,916,308 A | 4/1990 | Meadows |
| 4,928,094 A | 5/1990 | Smith |
| 4,943,806 A | 7/1990 | Masters et al. |
| 4,980,547 A | 12/1990 | Griffin |
| 4,990,901 A | 2/1991 | Beiswenger |
| 5,025,314 A | 6/1991 | Tang et al. |
| 5,025,411 A | 6/1991 | Tallman et al. |
| 5,097,516 A | 3/1992 | Amir |
| 5,103,085 A | 4/1992 | Zimmerman |
| 5,105,186 A | 4/1992 | May |
| 5,109,435 A | 4/1992 | Lo et al. |
| 5,130,794 A | 7/1992 | Ritcher |
| 5,140,647 A | 8/1992 | Ise et al. |
| 5,148,015 A | 9/1992 | Dolan |
| 5,162,618 A | 11/1992 | Knowles |
| 5,162,783 A | 11/1992 | Moreno |
| 5,164,714 A | 11/1992 | Wehrer |
| 5,168,531 A | 12/1992 | Sigel |
| 5,179,369 A | 1/1993 | Person et al. |
| 5,196,835 A | 3/1993 | Blue et al. |
| 5,196,836 A | 3/1993 | Williams |
| 5,239,152 A | 8/1993 | Caldwell et al. |
| 5,239,373 A | 8/1993 | Tang et al. |
| 5,272,470 A | 12/1993 | Zetts |
| 5,317,140 A | 5/1994 | Dunthorn |
| 5,359,155 A | 10/1994 | Heiser |
| 5,374,971 A | 12/1994 | Clapp et al. |
| 5,414,413 A | 5/1995 | Tamaru et al. |
| 5,422,494 A | 6/1995 | West et al. |
| 5,448,263 A | 9/1995 | Martin |
| 5,457,289 A | 10/1995 | Huang et al. |
| 5,483,261 A | 1/1996 | Yasutake |
| 5,483,603 A | 1/1996 | Luke et al. |
| 5,484,966 A | 1/1996 | Segan |
| 5,490,655 A | 2/1996 | Bates |
| 5,502,568 A | 3/1996 | Ogawa et al. |
| 5,525,764 A | 6/1996 | Junkins et al. |
| 5,528,263 A | 6/1996 | Platzker et al. |
| 5,528,290 A | 6/1996 | Saund |
| 5,537,107 A | 7/1996 | Funado |
| 5,554,828 A | 9/1996 | Primm |
| 5,581,276 A | 12/1996 | Cipolla et al. |
| 5,581,637 A | 12/1996 | Cass et al. |
| 5,591,945 A | 1/1997 | Kent |
| 5,594,469 A | 1/1997 | Freeman et al. |
| 5,594,502 A | 1/1997 | Bito et al. |
| 5,617,312 A | 4/1997 | Iura et al. |
| 5,638,092 A | 6/1997 | Eng et al. |
| 5,670,755 A | 9/1997 | Kwon |
| 5,686,942 A | 11/1997 | Ball |
| 5,698,845 A | 12/1997 | Kodama et al. |
| 5,729,704 A | 3/1998 | Stone et al. |
| 5,734,375 A | 3/1998 | Knox et al. |
| 5,736,686 A | 4/1998 | Perret, Jr. et al. |
| 5,737,740 A | 4/1998 | Henderson et al. |
| 5,739,479 A | 4/1998 | Davis-Cannon et al. |
| 5,745,116 A | 4/1998 | Pisutha-Arnond |
| 5,764,223 A | 6/1998 | Chang et al. |
| 5,771,039 A | 6/1998 | Ditzik |
| 5,784,054 A | 7/1998 | Armstrong et al. |
| 5,785,439 A | 7/1998 | Bowen |
| 5,786,810 A | 7/1998 | Knox et al. |
| 5,790,910 A | 8/1998 | Haskin |
| 5,801,704 A | 9/1998 | Oohara et al. |
| 5,804,773 A | 9/1998 | Wilson et al. |
| 5,818,421 A | 10/1998 | Ogino et al. |
| 5,818,424 A | 10/1998 | Korth |
| 5,819,201 A | 10/1998 | DeGraaf |
| 5,825,352 A | 10/1998 | Bisset et al. |
| 5,831,602 A | 11/1998 | Sato et al. |
| 5,854,491 A | 12/1998 | Pryor et al. |
| 5,909,210 A | 6/1999 | Knox et al. |
| 5,911,004 A | 6/1999 | Ohuchi et al. |
| 5,914,709 A | 6/1999 | Graham et al. |
| 5,920,342 A | 7/1999 | Umeda et al. |
| 5,936,615 A | 8/1999 | Waters |
| 5,940,065 A | 8/1999 | Babb et al. |
| 5,943,783 A | 8/1999 | Jackson |
| 5,963,199 A | 10/1999 | Kato et al. |
| 5,982,352 A | 11/1999 | Pryor |
| 5,988,645 A * | 11/1999 | Downing ..................... 273/348 |
| 5,990,874 A | 11/1999 | Tsumura et al. |
| 6,002,808 A | 12/1999 | Freeman |
| 6,008,798 A | 12/1999 | Mato, Jr. et al. |
| 6,031,531 A | 2/2000 | Kimble |
| 6,061,177 A | 5/2000 | Fujimoto |
| 6,075,905 A | 6/2000 | Herman et al. |
| 6,076,041 A | 6/2000 | Watanabe |
| 6,091,406 A | 7/2000 | Kambara et al. |
| 6,100,538 A | 8/2000 | Ogawa |
| 6,104,387 A | 8/2000 | Chery et al. |
| 6,118,433 A | 9/2000 | Jenkin et al. |
| 6,122,865 A | 9/2000 | Branc et al. |
| 6,128,003 A | 10/2000 | Smith et al. |
| 6,141,000 A | 10/2000 | Martin |
| 6,144,366 A | 11/2000 | Numazaki et al. |
| 6,147,678 A | 11/2000 | Kumar et al. |
| 6,153,836 A | 11/2000 | Goszyk |
| 6,161,066 A | 12/2000 | Wright et al. |
| 6,179,426 B1 | 1/2001 | Rodriguez, Jr. et al. |
| 6,188,388 B1 | 2/2001 | Arita et al. |
| 6,191,773 B1 | 2/2001 | Maruno et al. |
| 6,208,329 B1 | 3/2001 | Ballare |
| 6,208,330 B1 | 3/2001 | Hasegawa et al. |
| 6,209,266 B1 | 4/2001 | Branc et al. |
| 6,215,477 B1 | 4/2001 | Morrison et al. |
| 6,222,175 B1 | 4/2001 | Krymski |
| 6,226,035 B1 | 5/2001 | Korein et al. |
| 6,232,962 B1 | 5/2001 | Davis et al. |
| 6,252,989 B1 | 6/2001 | Geisler et al. |
| 6,256,033 B1 | 7/2001 | Nguyen |
| 6,262,718 B1 | 7/2001 | Findlay et al. |
| 6,310,610 B1 | 10/2001 | Beaton et al. |
| 6,320,597 B1 | 11/2001 | Ieperen |
| 6,323,846 B1 | 11/2001 | Westerman |
| 6,326,954 B1 | 12/2001 | Van Ieperen |
| 6,328,270 B1 | 12/2001 | Elberbaum |
| 6,335,724 B1 | 1/2002 | Takekawa et al. |
| 6,337,681 B1 | 1/2002 | Martin |
| 6,339,748 B1 | 1/2002 | Hiramatsu |
| 6,346,966 B1 | 2/2002 | Toh |
| 6,352,351 B1 | 3/2002 | Ogasahara et al. |
| 6,353,434 B1 | 3/2002 | Akebi |
| 6,359,612 B1 | 3/2002 | Peter et al. |
| 6,362,468 B1 | 3/2002 | Murakami et al. |
| 6,377,228 B1 | 4/2002 | Jenkin et al. |
| 6,384,743 B1 | 5/2002 | Vanderheiden |
| 6,414,671 B1 | 7/2002 | Gillespie et al. |
| 6,414,673 B1 | 7/2002 | Wood et al. |
| 6,421,042 B1 | 7/2002 | Omura et al. |
| 6,427,389 B1 | 8/2002 | Branc et al. |
| 6,429,856 B1 | 8/2002 | Omura et al. |
| 6,429,857 B1 | 8/2002 | Masters et al. |

(56) References Cited

U.S. PATENT DOCUMENTS

| | | |
|---|---|---|
| 6,480,187 B1 | 11/2002 | Sano et al. |
| 6,496,122 B2 | 12/2002 | Sampsell |
| 6,497,608 B2 | 12/2002 | Ho et al. |
| 6,498,602 B1 * | 12/2002 | Ogawa .................... 345/173 |
| 6,504,532 B1 | 1/2003 | Ogasahara et al. |
| 6,507,339 B1 | 1/2003 | Tanaka |
| 6,512,513 B2 | 1/2003 | Fleck et al. |
| 6,512,838 B1 | 1/2003 | Rafii et al. |
| 6,517,266 B2 | 2/2003 | Saund |
| 6,518,600 B1 | 2/2003 | Shaddock |
| 6,522,830 B2 | 2/2003 | Yamagami |
| 6,529,189 B1 | 3/2003 | Colgan et al. |
| 6,530,664 B2 | 3/2003 | Vanderwerf et al. |
| 6,531,999 B1 | 3/2003 | Trajkovic |
| 6,532,006 B1 | 3/2003 | Takekawa et al. |
| 6,540,366 B2 | 4/2003 | Keenan et al. |
| 6,540,679 B2 | 4/2003 | Slayton et al. |
| 6,545,669 B1 | 4/2003 | Kinawi et al. |
| 6,559,813 B1 | 5/2003 | DeLuca et al. |
| 6,563,491 B1 | 5/2003 | Omura |
| 6,567,078 B2 | 5/2003 | Ogawa |
| 6,567,121 B1 | 5/2003 | Kuno |
| 6,570,103 B1 | 5/2003 | Saka et al. |
| 6,570,612 B1 | 5/2003 | Saund et al. |
| 6,577,299 B1 * | 6/2003 | Schiller et al. ............. 345/179 |
| 6,587,099 B2 | 7/2003 | Takekawa |
| 6,590,568 B1 | 7/2003 | Astala et al. |
| 6,594,023 B1 | 7/2003 | Omura et al. |
| 6,597,508 B2 | 7/2003 | Seino et al. |
| 6,603,867 B1 | 8/2003 | Sugino et al. |
| 6,608,619 B2 | 8/2003 | Omura et al. |
| 6,614,422 B1 | 9/2003 | Rafii et al. |
| 6,624,833 B1 | 9/2003 | Kumar et al. |
| 6,626,718 B2 | 9/2003 | Hiroki |
| 6,630,922 B2 | 10/2003 | Fishkin et al. |
| 6,633,328 B1 | 10/2003 | Byrd et al. |
| 6,650,318 B1 | 11/2003 | Arnon |
| 6,650,822 B1 | 11/2003 | Zhou |
| 6,674,424 B1 | 1/2004 | Fujioka |
| 6,683,584 B2 | 1/2004 | Ronzani et al. |
| 6,690,357 B1 | 2/2004 | Dunton et al. |
| 6,690,363 B2 | 2/2004 | Newton |
| 6,690,397 B1 | 2/2004 | Daignault, Jr. |
| 6,710,770 B2 | 3/2004 | Tomasi et al. |
| 6,714,311 B2 | 3/2004 | Hashimoto |
| 6,720,949 B1 | 4/2004 | Pryor et al. |
| 6,736,321 B2 * | 5/2004 | Tsikos et al. ............ 235/462.14 |
| 6,738,051 B2 | 5/2004 | Boyd et al. |
| 6,741,250 B1 | 5/2004 | Furlan et al. |
| 6,747,636 B2 | 6/2004 | Martin |
| 6,756,910 B2 | 6/2004 | Ohba et al. |
| 6,760,009 B2 | 7/2004 | Omura et al. |
| 6,760,999 B2 | 7/2004 | Branc et al. |
| 6,774,889 B1 | 8/2004 | Zhang et al. |
| 6,778,207 B1 | 8/2004 | Lee et al. |
| 6,803,906 B1 | 10/2004 | Morrison et al. |
| 6,828,959 B2 | 12/2004 | Takekawa et al. |
| 6,829,372 B2 | 12/2004 | Fujioka |
| 6,864,882 B2 | 3/2005 | Newton |
| 6,911,972 B2 * | 6/2005 | Brinjes ..................... 345/175 |
| 6,919,880 B2 | 7/2005 | Morrison et al. |
| 6,927,384 B2 | 8/2005 | Reime et al. |
| 6,933,981 B1 | 8/2005 | Kishida et al. |
| 6,947,032 B2 | 9/2005 | Morrison et al. |
| 6,954,197 B2 | 10/2005 | Morrison et al. |
| 6,972,401 B2 | 12/2005 | Akitt et al. |
| 6,972,753 B1 | 12/2005 | Kimura et al. |
| 6,985,937 B1 | 1/2006 | Keshav et al. |
| 7,002,555 B1 | 2/2006 | Jacobsen et al. |
| 7,007,236 B2 | 2/2006 | Dempski et al. |
| 7,015,418 B2 | 3/2006 | Cahill et al. |
| 7,030,861 B1 | 4/2006 | Westerman et al. |
| 7,057,647 B1 | 6/2006 | Monroe |
| 7,058,204 B2 | 6/2006 | Hildreth et al. |
| 7,075,054 B2 | 7/2006 | Iwamoto et al. |
| 7,084,857 B2 | 8/2006 | Lieberman et al. |
| 7,084,859 B1 | 8/2006 | Pryor |
| 7,084,868 B2 | 8/2006 | Farag et al. |
| 7,113,174 B1 * | 9/2006 | Takekawa et al. ......... 345/173 |
| 7,151,533 B2 | 12/2006 | Van Ieperen |
| 7,176,904 B2 | 2/2007 | Satoh |
| 7,184,030 B2 | 2/2007 | McCharles et al. |
| 7,187,489 B2 | 3/2007 | Miles |
| 7,190,348 B2 | 3/2007 | Kennedy et al. |
| 7,190,496 B2 | 3/2007 | Klug et al. |
| 7,202,860 B2 | 4/2007 | Ogawa |
| 7,227,526 B2 | 6/2007 | Hildreth et al. |
| 7,232,986 B2 * | 6/2007 | Worthington et al. ....... 250/221 |
| 7,236,162 B2 | 6/2007 | Morrison et al. |
| 7,237,937 B2 | 7/2007 | Kawashima et al. |
| 7,242,388 B2 | 7/2007 | Lieberman et al. |
| 7,265,748 B2 | 9/2007 | Ryynanen |
| 7,268,692 B1 | 9/2007 | Lieberman et al. |
| 7,274,356 B2 | 9/2007 | Ung et al. |
| 7,283,126 B2 | 10/2007 | Leung |
| 7,283,128 B2 | 10/2007 | Sato |
| 7,289,113 B2 | 10/2007 | Martin |
| 7,302,156 B1 | 11/2007 | Lieberman et al. |
| 7,305,368 B2 | 12/2007 | Lieberman et al. |
| 7,330,184 B2 | 2/2008 | Leung |
| 7,333,094 B2 | 2/2008 | Lieberman et al. |
| 7,333,095 B1 | 2/2008 | Lieberman et al. |
| 7,355,593 B2 | 4/2008 | Hill et al. |
| 7,372,456 B2 | 5/2008 | McLintock |
| 7,375,720 B2 | 5/2008 | Tanaka |
| RE40,368 E | 6/2008 | Arnon |
| 7,411,575 B2 | 8/2008 | Hill et al. |
| 7,414,617 B2 | 8/2008 | Ogawa |
| 7,479,949 B2 | 1/2009 | Jobs et al. |
| 7,492,357 B2 | 2/2009 | Morrison et al. |
| 7,499,037 B2 | 3/2009 | Lube |
| 7,538,759 B2 | 5/2009 | Newton |
| 7,559,664 B1 | 7/2009 | Walleman et al. |
| 7,619,617 B2 | 11/2009 | Morrison et al. |
| 7,692,625 B2 | 4/2010 | Morrison et al. |
| 8,456,451 B2 * | 6/2013 | Morrison ............ G06F 3/03545 178/18.09 |
| 2001/0019325 A1 | 9/2001 | Takekawa |
| 2001/0022579 A1 | 9/2001 | Hirabayashi |
| 2001/0026268 A1 | 10/2001 | Ito |
| 2001/0033274 A1 | 10/2001 | Ong |
| 2001/0050677 A1 | 12/2001 | Tosaya |
| 2001/0055006 A1 | 12/2001 | Sano et al. |
| 2002/0008692 A1 | 1/2002 | Omura et al. |
| 2002/0015159 A1 | 2/2002 | Hashimoto |
| 2002/0036617 A1 | 3/2002 | Pryor |
| 2002/0041327 A1 | 4/2002 | Hildreth et al. |
| 2002/0050979 A1 | 5/2002 | Oberoi et al. |
| 2002/0064382 A1 | 5/2002 | Hildreth et al. |
| 2002/0067922 A1 | 6/2002 | Harris |
| 2002/0075243 A1 | 6/2002 | Newton |
| 2002/0080123 A1 | 6/2002 | Kennedy et al. |
| 2002/0118177 A1 | 8/2002 | Newton |
| 2002/0145595 A1 | 10/2002 | Satoh |
| 2002/0163530 A1 | 11/2002 | Takakura et al. |
| 2003/0001825 A1 * | 1/2003 | Omura et al. ............. 345/173 |
| 2003/0025951 A1 | 2/2003 | Pollard et al. |
| 2003/0043116 A1 | 3/2003 | Morrison et al. |
| 2003/0063073 A1 | 4/2003 | Geaghan et al. |
| 2003/0071858 A1 | 4/2003 | Morohoshi |
| 2003/0085871 A1 | 5/2003 | Ogawa |
| 2003/0095112 A1 | 5/2003 | Kawano et al. |
| 2003/0137494 A1 | 7/2003 | Tulbert |
| 2003/0142880 A1 * | 7/2003 | Hyodo ...................... 382/274 |
| 2003/0151532 A1 | 8/2003 | Chen et al. |
| 2003/0151562 A1 | 8/2003 | Kulas |
| 2003/0156118 A1 | 8/2003 | Ayinde |
| 2003/0161524 A1 | 8/2003 | King |
| 2003/0210803 A1 | 11/2003 | Kaneda et al. |
| 2003/0227492 A1 | 12/2003 | Wilde et al. |
| 2004/0001144 A1 | 1/2004 | McCharles et al. |
| 2004/0012573 A1 | 1/2004 | Morrison et al. |
| 2004/0021633 A1 | 2/2004 | Rajkowski |
| 2004/0031779 A1 | 2/2004 | Cahill et al. |

(56) References Cited

U.S. PATENT DOCUMENTS

| | | | |
|---|---|---|---|
| 2004/0032401 A1 | 2/2004 | Nakazawa et al. | |
| 2004/0046749 A1 | 3/2004 | Ideda | |
| 2004/0051709 A1 | 3/2004 | Ogawa et al. | |
| 2004/0071363 A1 | 4/2004 | Kouri et al. | |
| 2004/0108990 A1 | 6/2004 | Lieberman et al. | |
| 2004/0125086 A1 | 7/2004 | Hagermoser et al. | |
| 2004/0149892 A1 | 8/2004 | Akitt et al. | |
| 2004/0150630 A1 | 8/2004 | Hinckley et al. | |
| 2004/0169639 A1 | 9/2004 | Pate et al. | |
| 2004/0178993 A1 | 9/2004 | Morrison et al. | |
| 2004/0178997 A1 | 9/2004 | Gillespie et al. | |
| 2004/0179001 A1 | 9/2004 | Morrison et al. | |
| 2004/0189720 A1 | 9/2004 | Wilson et al. | |
| 2004/0201575 A1* | 10/2004 | Morrison | 345/173 |
| 2004/0204129 A1 | 10/2004 | Payne et al. | |
| 2004/0218479 A1 | 11/2004 | Iwamoto et al. | |
| 2004/0221265 A1 | 11/2004 | Leung et al. | |
| 2004/0252091 A1 | 12/2004 | Ma et al. | |
| 2005/0012573 A1* | 1/2005 | Grandchamp | 333/243 |
| 2005/0052427 A1 | 3/2005 | Wu et al. | |
| 2005/0057524 A1 | 3/2005 | Hill et al. | |
| 2005/0077452 A1 | 4/2005 | Morrison et al. | |
| 2005/0083308 A1 | 4/2005 | Homer et al. | |
| 2005/0104860 A1 | 5/2005 | McCreary et al. | |
| 2005/0128190 A1 | 6/2005 | Ryynanen | |
| 2005/0151733 A1 | 7/2005 | Sander et al. | |
| 2005/0156900 A1 | 7/2005 | Hill et al. | |
| 2005/0190162 A1 | 9/2005 | Newton | |
| 2005/0241929 A1 | 11/2005 | Auger et al. | |
| 2005/0243070 A1 | 11/2005 | Ung et al. | |
| 2005/0243411 A1* | 11/2005 | Cook | 359/363 |
| 2005/0248539 A1* | 11/2005 | Morrison et al. | 345/173 |
| 2005/0248540 A1 | 11/2005 | Newton | |
| 2005/0270781 A1 | 12/2005 | Marks | |
| 2005/0276448 A1 | 12/2005 | Pryor | |
| 2006/0012579 A1 | 1/2006 | Sato | |
| 2006/0022962 A1 | 2/2006 | Morrison et al. | |
| 2006/0028456 A1 | 2/2006 | Kang | |
| 2006/0034486 A1 | 2/2006 | Morrison et al. | |
| 2006/0152500 A1 | 7/2006 | Weng | |
| 2006/0158437 A1 | 7/2006 | Blythe et al. | |
| 2006/0163446 A1* | 7/2006 | Guyer et al. | 250/203.1 |
| 2006/0170658 A1 | 8/2006 | Nakamura et al. | |
| 2006/0192799 A1 | 8/2006 | Vega et al. | |
| 2006/0197749 A1 | 9/2006 | Popovich | |
| 2006/0202953 A1 | 9/2006 | Pryor et al. | |
| 2006/0227120 A1 | 10/2006 | Eikman | |
| 2006/0244734 A1 | 11/2006 | Hill et al. | |
| 2006/0274067 A1 | 12/2006 | Hidai | |
| 2006/0279558 A1 | 12/2006 | Van Delden et al. | |
| 2007/0002028 A1 | 1/2007 | Morrison et al. | |
| 2007/0019103 A1* | 1/2007 | Lieberman et al. | 348/344 |
| 2007/0075648 A1 | 4/2007 | Blythe et al. | |
| 2007/0075982 A1 | 4/2007 | Morrison et al. | |
| 2007/0089915 A1 | 4/2007 | Ogawa et al. | |
| 2007/0116333 A1 | 5/2007 | Dempski et al. | |
| 2007/0126755 A1 | 6/2007 | Zhang et al. | |
| 2007/0139932 A1 | 6/2007 | Sun et al. | |
| 2007/0152984 A1 | 7/2007 | Ording et al. | |
| 2007/0152986 A1 | 7/2007 | Ogawa | |
| 2007/0165007 A1 | 7/2007 | Morrison et al. | |
| 2007/0167709 A1 | 7/2007 | Slayton et al. | |
| 2007/0205994 A1 | 9/2007 | van Ieperen | |
| 2007/0236454 A1 | 10/2007 | Ung et al. | |
| 2007/0269107 A1 | 11/2007 | Iwai et al. | |
| 2007/0273842 A1 | 11/2007 | Morrison et al. | |
| 2007/0285805 A1* | 12/2007 | Lundgren | 359/784 |
| 2007/0290996 A1 | 12/2007 | Ting | |
| 2007/0291125 A1 | 12/2007 | Marquet | |
| 2008/0029691 A1 | 2/2008 | Han | |
| 2008/0042999 A1 | 2/2008 | Martin | |
| 2008/0055262 A1 | 3/2008 | Wu et al. | |
| 2008/0055267 A1 | 3/2008 | Wu et al. | |
| 2008/0062140 A1 | 3/2008 | Hotelling et al. | |
| 2008/0062149 A1* | 3/2008 | Baruk | 345/175 |
| 2008/0068352 A1 | 3/2008 | Worthington et al. | |
| 2008/0083602 A1 | 4/2008 | Auger et al. | |
| 2008/0106706 A1 | 5/2008 | Holmgren et al. | |
| 2008/0122803 A1 | 5/2008 | Izadi et al. | |
| 2008/0129707 A1 | 6/2008 | Pryor | |
| 2008/0259050 A1 | 10/2008 | Lin et al. | |
| 2008/0259052 A1 | 10/2008 | Lin et al. | |
| 2008/0292196 A1* | 11/2008 | Jain et al. | 382/225 |
| 2009/0058832 A1 | 3/2009 | Newton | |
| 2009/0058833 A1 | 3/2009 | Newton | |
| 2009/0146972 A1 | 6/2009 | Morrison et al. | |
| 2010/0193259 A1* | 8/2010 | Wassvik | G06F 3/0423 178/18.09 |
| 2010/0309169 A1* | 12/2010 | Lieberman | G06F 3/0428 345/175 |
| 2011/0006981 A1* | 1/2011 | Chtchetinine | G06F 3/0325 345/157 |
| 2011/0316814 A1* | 12/2011 | Kao | G06F 3/0428 345/175 |

FOREIGN PATENT DOCUMENTS

| | | |
|---|---|---|
| CA | 2058219 A1 | 4/1993 |
| CA | 2367864 A1 | 4/1993 |
| CA | 2219886 A1 | 4/1999 |
| CA | 2251221 A1 | 4/1999 |
| CA | 2267733 A1 | 10/1999 |
| CA | 2268208 A1 | 10/1999 |
| CA | 2252302 A1 | 4/2000 |
| CA | 2350152 A1 | 6/2001 |
| CA | 2412878 A1 | 1/2002 |
| CA | 2341918 A1 | 9/2002 |
| CA | 2386094 A1 | 12/2002 |
| CA | 2372868 A1 | 8/2003 |
| CA | 2390503 A1 | 12/2003 |
| CA | 2390506 A1 | 12/2003 |
| CA | 2432770 A1 | 12/2003 |
| CA | 2493236 A1 | 12/2003 |
| CA | 2448603 A1 | 5/2004 |
| CA | 2453873 A1 | 7/2004 |
| CA | 2460449 A1 | 9/2004 |
| CA | 2521418 A1 | 10/2004 |
| CA | 2481396 A1 | 3/2005 |
| CA | 2491582 A1 | 7/2005 |
| CA | 2563566 A1 | 11/2005 |
| CA | 2564262 A1 | 11/2005 |
| CA | 2501214 A1 | 9/2006 |
| CA | 2606863 A1 | 11/2006 |
| CA | 2580046 A1 | 9/2007 |
| CN | 1310126 C | 8/2001 |
| CN | 1784649 A | 6/2006 |
| CN | 101019096 A | 8/2007 |
| CN | 101023582 A | 8/2007 |
| CN | 1440539 A | 9/2009 |
| DE | 3836429 | 5/1990 |
| DE | 198 10 452 A1 | 12/1998 |
| DE | 60124549 | 9/2007 |
| EP | 0125068 A2 | 11/1984 |
| EP | 0279652 A | 8/1988 |
| EP | 0347725 A2 | 12/1989 |
| EP | 0420335 | 4/1991 |
| EP | 0 657 841 A1 | 6/1995 |
| EP | 0762319 A2 | 3/1997 |
| EP | 0829798 A2 | 3/1998 |
| EP | 0897161 A1 | 2/1999 |
| EP | 0911721 A2 | 4/1999 |
| EP | 1059605 A2 | 12/2000 |
| EP | 1262909 A2 | 12/2002 |
| EP | 1739528 A1 | 1/2003 |
| EP | 1739529 A1 | 1/2003 |
| EP | 1420335 A2 | 5/2004 |
| EP | 1 450 243 A2 | 8/2004 |
| EP | 1457870 A2 | 9/2004 |
| EP | 1471459 A2 | 10/2004 |
| EP | 1517228 A2 | 3/2005 |
| EP | 1550940 A2 | 6/2005 |
| EP | 1611503 A | 1/2006 |
| EP | 1674977 A | 6/2006 |
| EP | 1741186 A | 1/2007 |

(56) References Cited

FOREIGN PATENT DOCUMENTS

| | | |
|---|---|---|
| EP | 1766501 A | 3/2007 |
| EP | 1830248 A1 | 9/2007 |
| EP | 1877893 A | 1/2008 |
| ES | 2279823 T3 | 9/2007 |
| GA | 2176282 A | 5/1986 |
| GB | 1575420 | 9/1980 |
| GB | 2204126 A | 11/1988 |
| GB | 2263765 A | 8/1993 |
| JP | 57-211637 A | 12/1982 |
| JP | 61-196317 A | 8/1986 |
| JP | 62-005428 | 1/1987 |
| JP | 63-223819 | 9/1988 |
| JP | 3-054618 A | 3/1991 |
| JP | 03-244017 | 10/1991 |
| JP | 4-355815 A | 12/1992 |
| JP | 5-181605 A | 7/1993 |
| JP | 5-189137 A | 7/1993 |
| JP | 5-197810 A | 8/1993 |
| JP | 06-110608 | 4/1994 |
| JP | 7-110733 A | 4/1995 |
| JP | 7-230352 A | 8/1995 |
| JP | 8-016931 B2 | 2/1996 |
| JP | 8-108689 A | 4/1996 |
| JP | 8-240407 A | 9/1996 |
| JP | 8-315152 A | 11/1996 |
| JP | 9-091094 A | 4/1997 |
| JP | 9-224111 A | 8/1997 |
| JP | 9-319501 A | 12/1997 |
| JP | 10-105324 A | 4/1998 |
| JP | 10-222646 A | 8/1998 |
| JP | 11-064026 A | 3/1999 |
| JP | 11-085376 A | 3/1999 |
| JP | 11-110116 A | 4/1999 |
| JP | 11-203042 | 7/1999 |
| JP | 11-212692 | 8/1999 |
| JP | 2000-105671 A | 4/2000 |
| JP | 2000-132340 A | 5/2000 |
| JP | 2001-142642 | 5/2001 |
| JP | 2001-282456 A | 10/2001 |
| JP | 2002-055770 | 2/2002 |
| JP | 2002-236547 A | 8/2002 |
| JP | 2003-65716 A | 3/2003 |
| JP | 2003-167669 A | 6/2003 |
| JP | 2003-173237 A | 6/2003 |
| JP | 2005-108211 A | 4/2005 |
| JP | 2005-182423 A | 7/2005 |
| JP | 2005-202950 A | 7/2005 |
| WO | 98/07112 A2 | 2/1998 |
| WO | 99/08897 A1 | 2/1999 |
| WO | 99/21122 A1 | 4/1999 |
| WO | 99/28812 A1 | 6/1999 |
| WO | 99/40562 A1 | 8/1999 |
| WO | 01/24157 A1 | 4/2001 |
| WO | 01/31570 A2 | 5/2001 |
| WO | 01/63550 A2 | 8/2001 |
| WO | 01/91043 A2 | 11/2001 |
| WO | 02/03316 A1 | 1/2002 |
| WO | 02/07073 A2 | 1/2002 |
| WO | 02/27461 A1 | 4/2002 |
| WO | 03/104887 A2 | 12/2003 |
| WO | 03/105074 A2 | 12/2003 |
| WO | 2004/072843 A1 | 8/2004 |
| WO | 2004/090706 A2 | 10/2004 |
| WO | 2004/102523 A1 | 11/2004 |
| WO | 2004/104810 A1 | 12/2004 |
| WO | 2005/031554 A1 | 4/2005 |
| WO | 2005034027 A1 | 4/2005 |
| WO | 2005/107072 A1 | 11/2005 |
| WO | 2006/002544 A1 | 1/2006 |
| WO | 2006/092058 A1 | 9/2006 |
| WO | 2006/095320 A2 | 9/2006 |
| WO | 2006/096962 A1 | 9/2006 |
| WO | 2006/116869 A1 | 11/2006 |
| WO | 2007/003196 A2 | 1/2007 |
| WO | 2007/019600 A1 | 2/2007 |
| WO | 2007/037809 | 4/2007 |
| WO | 2007/064804 A1 | 6/2007 |
| WO | 2007/079590 | 7/2007 |
| WO | 2007/132033 A1 | 11/2007 |
| WO | 2007/134456 A1 | 11/2007 |
| WO | 2008/128096 A2 | 10/2008 |
| WO | 2009/029764 A1 | 3/2009 |
| WO | 2009/029767 A1 | 3/2009 |
| WO | 2009/146544 A1 | 12/2009 |
| WO | 2010/051633 A1 | 5/2010 |

OTHER PUBLICATIONS

International Search Report with a date of mailing of Oct. 22, 2001 for PCT/CA 01/00980 with an International Filing Date of Jul. 5, 2001.
Bud K. Funk, CCDs in optical panels deliver high resolution, Electronic Design, Sep. 27, 1980, pp. 139-143.
Bernhard P. Wrobel, "Minimum Solutions for Orientation", Calibration and Orientation of Cameras in Computer Vision, Springer Series in Infomation Sciences, vol. 34, 2001, pp. 28-33.
Kenichi Kanatani, "Camera Calibration", Geometric Computation for Machine Vision, Oxford Engineering Science Series, vol. 37, 1993, pp. 56-63.
Richard Hartley and Andrew Zisserman, "Multiple View Geometry in Computer Vision", Cambridge University Press, First published 2000, Reprinted (with corrections) 2001, pp. 70-73, 92-93 and 98-99.
Wolfgang Förstner, "On Estimating Rotations", Festschrift far Prof. Dr.-Ing. Heinrich Ebner zum 60. Geburtstag, Herausg.: C. Heipke und H. Mayer, Lehrstuhl für Photogrammetrie und Fernerkundung, TU München, 1999, 12 pages. (http://www.ipb.uni-bonn.de/papers/#1999).
European Search Report for EP 04 25 1392 for a search that was completed on Jan. 11, 2007.
European Search Report for EP 06 01 9269 for a search that was completed on Nov. 9, 2006.
European Search Report for EP 06 01 9268 for a search that was completed on Nov. 9, 2006.
European Search Report for EP 02 25 3594 for a search that was completed on Dec. 14, 2005.
Fie-Yue Wang, et al., "Stereo camera calibration without absolute world coordinate information", SPIE, vol. 2620, pp. 655-662, Jun. 14, 1995.
Notification of Transmittal of the International Search Report and the Written Opinion of the International Searching Authority regarding International Application No. PCT/CA2007/002184, as mailed on Mar. 13, 2008.
International Search Report for PCT/CA2008/001350 mailed Oct. 17, 2008 (5 Pages).
International Search Report and Written Opinion for PCT/CA2004/001759 mailed Feb. 21, 2005 (7 Pages).
International Search Report and Written Opinion for PCT/CA2009/000773 mailed Aug. 12, 2009 (11 Pages).
European Search Opinion for EP 07 25 0888 dated Jun. 22, 2007 (2 pages).
European Search Report for EP 07 25 0888 dated Jun. 22, 20067 (2 pages).
May 12, 2009 Office Action for Canadian Patent Application No. 2,412,878 (4 pages).
Tapper, C.C., et al., "On-Line Handwriting Recognition—A Survey", Proceedings of the International Conference on Pattern Recognition (ICPR), Rome, Nov. 14-17, 1988, Washington, IEEE Comp. Soc. Press. US, vol. 2 Conf. 9, Nov. 14, 1988, pp. 1123-1132.
Press Release, "IntuiLab introduces IntuiFace, An interactive table and its application platform" Nov. 30, 2007.
Overview page for IntuiFace by IntuiLab, Copyright 2008.
NASA Small Business Innovation Research Program: Composite List of Projects 1983-1989, Aug. 1990.
*Touch Panel*, vol. 1 No. 1 (2005).
*Touch Panel*, vol. 1 No. 2 (2005).
*Touch Panel*, vol. 1 No. 3 (2006).
*Touch Panel*, vol. 1 No. 4 (2006).
*Touch Panel*, vol. 1 No. 5 (2006).

(56) References Cited

OTHER PUBLICATIONS

*Touch Panel*, vol. 1 No. 6 (2006).
*Touch Panel*, vol. 1 No. 7 (2006).
*Touch Panel*, vol. 1 No. 8 (2006).
*Touch Panel*, vol. 1 No. 9 (2006).
*Touch Panel*, vol. 1 No. 10 (2006).
*Touch Panel*, vol. 2 No. 1 (2006).
*Touch Panel*, vol. 2 No. 2 (2007).
*Touch Panel*, vol. 2 No. 3 (2007).
*Touch Panel*, vol. 2 No. 4 (2007).
*Touch Panel*, vol. 2 No. 5 (2007).
*Touch Panel*, vol. 2 No. 6 (2007).
*Touch Panel*, vol. 2 No. 7-8 (2008).
*Touch Panel*, vol. 2 No. 9-10 (2008).
*Touch Panel*, vol. 3 No. 1-2 (2008).
*Touch Panel*, vol. 3 No. 3-4 (2008).
*Touch Panel*, vol. 3 No. 5-6 (2009).
*Touch Panel*, vol. 3 No. 7-8 (2009).
*Touch Panel*, vol. 3 No. 9 (2009).
*Touch Panel*, vol. 4 No. 2-3 (2009).
English Translation of Decision of Rejection for Japanese Patent Application No. 2002-507309, date of Decision: Aug. 18, 2011, 9 pages.
International Preliminary Report on Patentability, PCT/NZ2004/000029, May 20, 2005 (21 pages).
"International Preliminary Report on Patentability", PCT/US2008/060102, Oct. 22, 2009 (9 pages).
International Search Report for PCT/CA2010/001085 mailed Oct. 12, 2010 (5 pages).
"International Application Serial No. PCT/US2008/060102, Search Report & Written opinion mailed Feb. 12, 2009" (14 pages).
International Application Serial No. PCT/US2008/074749, Search Report & Written Opinion mailed Feb. 11, 2009 (10 pages).
"International Application Serial No. PCT/US2008/074755, International Search Report and Written Opinion mailed Jan. 29 2009" (14 pages).
International Search Report for PCT/NZ05/00092 Sep. 27, 2006 (4 pages).
Loinaz et al., "A 200-mW, 3.3-V, CMOS Color Camera IC Producing 352×288 24-B Video at 30 Frames/s," IEEE Journal of Solid-StateCircuits,vol. 31,No. 12,Dec. 1998, pp. 2092-2103.
Yawcheng Lo, "Solid-state image sensor: technologies and applications," Input/Output and Imaging Technologies, Y.T. Tsai, T-M. Kung, and J. Larsen, eds. SPIE Proceedings vol. 3422, pp. 70-80 (1998).
*Touch Panel*, vol. 5 No. 2-3 (Sep. 2010).
*Touch Panel*, vol. 5 No. 4 (Nov. 2010).
"Store Window Presentations", Heddier Electronic.
"ThruGlass", Projected Capacitive Touchscreencs Specifications, Micro Touch.
Benko, et al., "Precise Selection Techniques for Multi-Touch Screens", Proc. ACM CHI 2006: Human Factors in Computer Systems, pp. 1263-1272.
Buxton, W., "Issues and Techniques in Touch-Sensitive Tablet Input," Computer Graphics, 19(3), Proceedings of SIGGRAPH '85, 1985, pp. 215-223.
VGA-format CMOS Camera-on-a-Chip for Multimedia Applications, Photobit Corporation, 1999 (2 pages).
"White Paper", Digital Vision Touch Technology Feb. 2003.
Aug. 24, 2011 letter from Olivares & CIA to David A. Ruston summarizing an Office Action for Mexican Patent Application No. MX/a/2009/005943.
Feb. 23, 2012 letter from Olivares & CIA to David A. Ruston summarizing an Office Action for Mexican Patent Application No. MX/a/2009/005943.

\* cited by examiner

INTERACTIVE INPUT SYSTEM AND METHOD

FIELD OF THE INVENTION

The present invention relates to an interactive input or touch system and method.

BACKGROUND OF THE INVENTION

Touch systems are well known in the art and typically include a touch screen or panel having a touch surface on which contacts are made using a pointer in order to generate user input. Pointer contacts with the touch surface are detected and are used to generate corresponding output depending on areas of the touch surface where the contacts are made. Common touch systems utilize analog resistive, electromagnetic, capacitive, acoustic or machine vision to identify pointer interactions with the touch surface.

For example, International PCT Application No. PCT/CA01/00980 filed on Jul. 5, 2001 and published under No. WO 02/03316 on Jan. 10, 2002, assigned to SMART Technologies Inc., assignee of the present application, discloses a camera-based touch system comprising a touch screen that defines a touch surface on which a computer-generated image is presented. Depending on the application, a front or rear projection device may be used to project the image that is visible on the touch surface. A rectangular bezel or frame surrounds the touch surface and supports wide-angle digital cameras at its corners. The digital cameras have overlapping fields of view that encompass and look generally across the entire touch surface from different viewpoints. The digital cameras acquire images looking across the touch surface and generate image data. Image data acquired by the digital cameras is processed by digital signal processors to determine if a pointer exists in the captured image data. When it is determined that a pointer exists in the captured image data, the digital signal processors convey pointer characteristic data to a master controller, which in turn processes the pointer characteristic data to determine the location of the pointer in (x,y)-coordinates relative to the touch surface using triangulation. The pointer coordinate data is conveyed to a computer executing one or more applications programs. The computer uses the pointer coordinate data to update the computer-generated image that is presented on the touch surface. Pointer contacts on the touch surface can therefore be recorded as writing or drawing or used to control execution of applications programs executed by the computer.

In many environments such as in teaching institutions, large scale touch systems are desired so that visible presentations can be made to large groups. To satisfy this need, a large scale touch system as disclosed in U.S. patent application Ser. No. 10/750,219 to Hill et al. and assigned to SMART Technologies Inc., assignee of the subject application, has been developed. This large scale touch system includes a touch panel having a plurality of input sub-regions. The input sub-regions overlap to define a generally contiguous input surface. Each coordinate input sub-region comprises a set of wide-angle digital cameras having different viewpoints that look across an associated portion of the input surface. Each input sub-region processes image data captured by the digital cameras and generates pointer coordinate data in response to pointer contacts on the associated portion of the input surface. The pointer coordinate data is processed to update image data presented on the input surface. When a pointer contact is made on a coordinate input sub-region that does not overlap with an adjacent coordinate input sub-region, the coordinate input sub-region processes acquired images to derive pointer data and triangulates the position of the pointer using the derived pointer data thereby to determine the position of the pointer contact relative to the input surface. When a pointer contact is made on a coordinate input sub-region that overlaps with an adjacent coordinate input sub-region, each overlapping coordinate input sub-regions processes acquired images to derive pointer data and triangulates the position of the pointer using the derived pointer data. Thereafter, the triangulated positions generated by the overlapping coordinate input sub-regions are processed in accordance with defined logic thereby to determine the position of the pointer contact relative to the input surface.

Although the above touch systems work extremely well, resolution issues arise as the size of the touch surface increases. Typically cameras with very wide fields of view are employed so that each camera sees the entire touch surface. However, when a pointer is brought into contact with the touch surface at a location that is far from one or more of the cameras, the pointer may appear very small to those cameras. In fact, to the cameras, the pointer may appear to be only one (1) or two (2) pixels wide making pointer detection difficult and unreliable. As will be appreciated, there is a need to improve pointer detection especially in touch systems having very large touch surfaces.

It is therefore an object of the present invention to provide a novel interactive input system and method.

SUMMARY OF THE INVENTION

Accordingly, in one aspect there is provided in an interactive input system comprising:

imaging devices with different viewpoints and having at least partially overlapping fields of view encompassing a region of interest, at least two of said imaging devices having different focal lengths; and processing structure processing image data acquired by the imaging devices to detect the existence of a pointer and determine the location of the pointer within the region of interest.

In one embodiment, at least some of the imaging devices are arranged in pairs. One imaging device of each pair has a wide field of view and the other imaging device of each pair has a narrow field of view. The wide field of view fully encompasses the narrow field of view. The imaging devices of each pair may be stacked vertically or arranged side-by-side.

In one embodiment, a touch surface is associated with the region of interest. Pairs of imaging devices are positioned adjacent corners of the touch surface. The imaging devices of each pair look generally across the touch surface. For each imaging device pair, the processing structure processes image data acquired by each imaging device of the pair to determine if a pointer is believed to exist in the image data with a desired level of confidence and further processes that image data to determine the location of the pointer. The desired level of confidence is existence of a pointer beyond a threshold size. The processing structure processes the image data acquired by the imaging devices of each pair to verify at least one of pointer existence and pointer location.

According to another aspect there is provided a touch system comprising:

a touch surface on which an image is visible;

imaging assemblies about the periphery of said touch surface, said imaging assemblies having at least partially overlapping fields of view encompassing said touch surface, each imaging assembly comprising at least two imaging devices with each imaging device having a different focal length; and processing structure processing data generated by the imaging assemblies to determine the location of at least one pointer relative to the touch surface.

According to yet another aspect there is provided an interactive input system comprising:

camera assemblies with different viewpoints and having fields of view encompassing a region of interest, each camera assembly comprising at least two image sensors with the image sensors having different focal lengths; and processing structure processing image data acquired by said camera assemblies to detect one or more pointers in said region of interest.

The interactive input system and method provides advantages in that reliable pointer detection can be achieved even in instances where the pointer is remote from one or more of the imaging devices. In addition, as in some instances imaging devices of different focal lengths see the same object, data extracted from the images acquired by the imaging devices can be used to calibrate the imaging devices and verify the pointer location.

BRIEF DESCRIPTION OF THE DRAWINGS

Embodiments will now be described more fully with reference to the accompanying drawings in which.

DETAILED DESCRIPTION OF THE EMBODIMENTS

Figure 1:
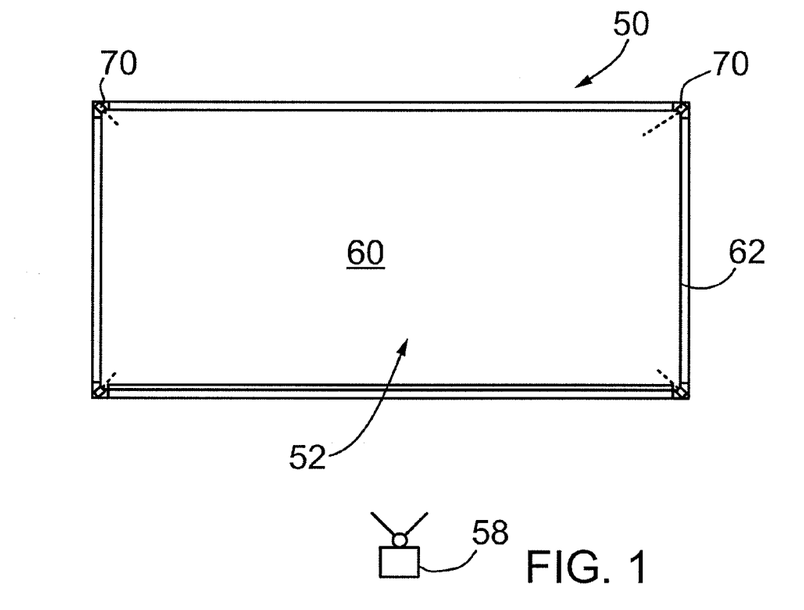
FIG. 1 is a front plan view of a camera-based interactive input system.
Figure 2:
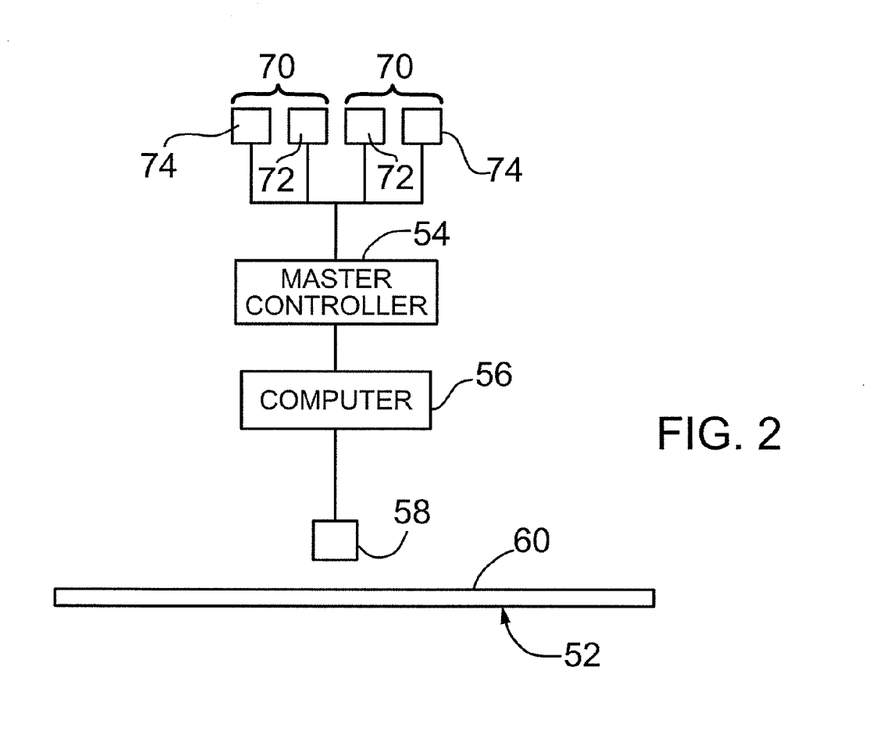
FIG. 2 is a schematic diagram of the interactive input system of FIG. 1.

Referring now to FIGS. 1 and 2, a camera-based touch system is shown and is generally identified by reference numeral 50. Camera-based touch system 50 is similar to that disclosed in previously referenced International PCT Application Serial No. WO 02/03316, assigned to SMART Technologies Inc., assignee of the subject application, the content of which is incorporated herein by reference.

As can be seen, touch system 50 includes a touch panel 52 coupled to a digital signal processor (DSP)-based master controller 54. Master controller 54 is also coupled to a computer 56. Computer 56 executes one or more application programs and provides computer-generated image output to a projection device 58. Projection device 58 in turn presents a computer-generated image that is visible on the surface 60 of the touch screen 52. The touch panel 52, master controller 54, computer 56 and projection device 58 form a closed-loop so that pointer contacts on the touch surface 60 can be recorded as writing or drawing or used to control execution of application programs executed by the computer 56.

Figure 3:
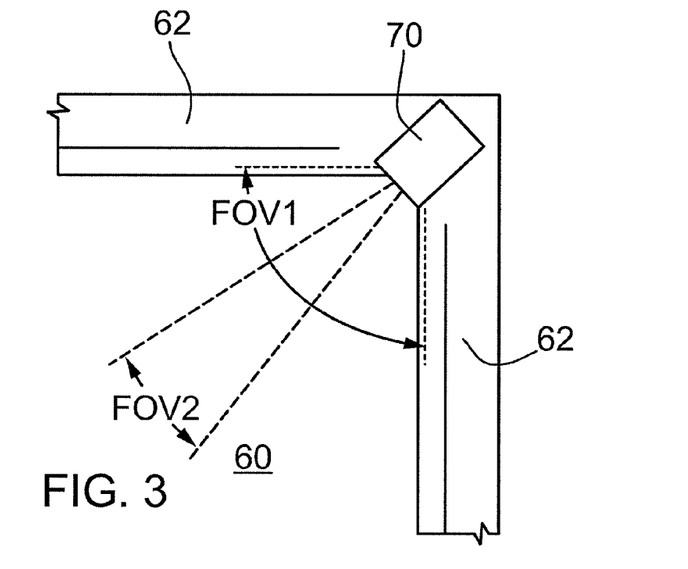
FIG. 3 is an enlarged front plan view of a corner of the touch panel of FIG. 2.
Figures 4, 5:
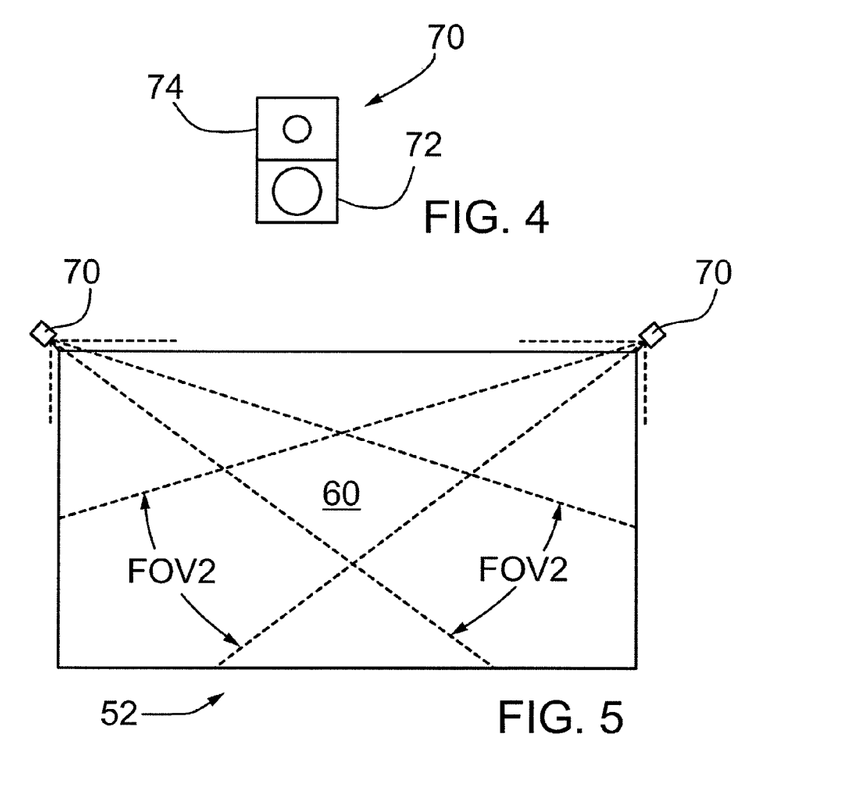
FIG. 4 is a front plan view of a camera assembly forming part of the touch panel of FIG. 2.
FIG. 5 is a front plan view of the touch panel of FIG. 2 showing the fields of view of the camera assemblies.

The touch surface 60 is bordered by a bezel or frame 62 similar to that disclosed in U.S. Pat. No. 6,972,401 to Akitt et al. issued on Dec. 6, 2005, assigned to SMART Technologies, Inc. assignee of the subject application, the content of which is incorporated herein by reference. A DSP-based digital camera assembly 70 having on-board processing capabilities, best seen in FIGS. 3 and 4, is positioned adjacent each top corner of the touch surface 60 and is accommodated by the bezel 62. In this embodiment, each digital camera assembly 70 comprises a pair of camera sensors 72 and 74 that look across the touch surface 60 and a processing unit (not shown) communicating with the camera sensors. The focal lengths of the camera sensors 72 and 74 are different as will be described. The camera sensors 72 and 74 of each digital camera assembly 70 are vertically stacked on top of one another. The optical axes of the camera sensors 72 and 74 are in line with the diagonals of the touch surface 60 and thus, the optical axes bisect the diagonally opposite corners of the touch surface 60.

The lower camera sensor 72 of each digital camera assembly 70 has a wide angle lens giving the camera sensor 72 a wide field of view so that the lower camera sensor 72 sees the entire touch surface 60. The upper camera sensor 74 of each digital camera assembly 70 has a narrow angle lens giving the camera sensor 74 a long and narrow field of view so that the upper camera sensor 74 sees only a portion of the touch surface 60. In this embodiment, the lower camera sensor 72 has a field of view equal to about 95°. The upper camera sensor 74 has a field of view in the range of from about 30° to 60°. Those of skill in the art will however appreciate that other combinations of fields of view for the lower and upper camera sensors 72 and 74 can be selected. As the camera sensors 72 and 74 are stacked on top of one another, the field of view (FOV1) of the lower camera sensor 72 fully encompasses the field of view (FOV2) of the upper camera sensor 74 as shown in FIG. 5. In this manner, the upper camera sensors 74 are best suited to detect accurately pointers that are distant from the digital camera assemblies 70 while the lower camera sensors 72 are best suited to detect accurately pointers that are proximate to the digital camera assemblies 70.

During operation of the touch system 50, the camera sensors 72 and 74 of each digital camera assembly 70, look across the touch surface 60 and acquire images. For each digital camera assembly 70, image data acquired by each camera sensor 72 and 74 thereof, is processed by the processing unit to determine if a pointer is believed to exist in each captured image with a desired level of confidence (i.e. the pointer is above a threshold size in the captured image). As will be appreciated, when the pointer is remote from a digital camera assembly 70, only its upper camera sensor 74 will detect the existence of a pointer with the desired level of accuracy and when the pointer is near the digital camera assembly 70, only its lower camera sensor 72 will detect the existence of the pointer with the desired level of accuracy. When a pointer is determined to exist in one of the captured images with the desired level of confidence, pointer characteristic data is derived from that captured image identifying the pointer position in the captured image. If the pointer is determined to exist in both captured images with the desired level of confidence, the pointer characteristic data is derived from the captured image in which the pointer appears the largest.

The pointer characteristic data derived by each digital camera assembly 70 is then conveyed to the master controller 54, which in turn processes the pointer characteristic data in a manner similar to that described in U.S. Pat. No. 6,954,197 to Morrison et al. issued on Oct. 4, 2005, assigned to SMART Technologies Inc., assignee of the subject application, the content of which is incorporated by reference, so that a bounding box surrounding the pointer contact on the touch surface 60 is determined allowing the location of the pointer in (x,y)-coordinates to be calculated.

The pointer coordinate data is then reported to the computer 56, which in turn records the pointer coordinate data as writing or drawing if the pointer contact is a write event or injects the pointer coordinate data into the active application program being run by the computer 56 if the pointer contact is a mouse event. As mentioned above, the computer 56 also updates the image data conveyed to the projection device 58 so that the image presented on the touch surface 60 reflects the pointer activity.

If desired, the image processing results during pointer existence determination for both the upper and lower camera sensors 72 and 74 of each digital camera assembly 70 can be compared to verify the existence of the pointer. Pointer characteristic data for each captured image can also be generated and compared to verify the location of the pointer within the captured images. Also, as the camera sensors 72 and 74 of each digital camera assembly 70 both see the same pointer when the pointer is brought towards the touch surface 60, pointer data derived from acquired images can be used to calibrate the camera sensors 72 and 74 of the digital camera assemblies 70.

Although the digital camera assemblies 70 are described as having vertically stacked camera sensors 72 and 74 with the field of view of the wide angle camera sensor 72 fully encompassing the field of view of the narrow angle camera sensor 74, those of skill in the art will appreciate that other camera assembly arrangements are possible. For example, the camera sensors 72 and 74 of the digital camera assemblies 70 may be arranged side-by-side with the field of view of the wide angle camera sensors 72 still fully encompassing the field of view of the narrow angle camera sensors 74. Of course, other camera sensor orientations are possible. The field of view of the wide angle camera sensor 72 need not fully encompass the field of view of the narrow angle camera sensor 74. The fields of view of the wide angle and narrow angle camera sensors can of course only partially overlap. As will be appreciated, in this arrangement there is less redundancy.

In the embodiment described above, although each camera assembly 70 is described as comprising two camera sensors 72 and 74 communicating with a single processing unit, each camera sensor may communicate with an associated processing unit. In this case, the processing units of each camera assembly 70 communicate to determine which processing unit is to provide pointer data to the master controller 54. In situations where a pointer is seen best by one camera sensor but the pointer is moving in a direction that is better viewed by the other camera sensor, the processing units can communicate pointer data between one another to ensure accurate pointer tracking as responsibility for tracking the pointer is handed from one processing unit to the other.

The touch system 50 as described above comprises a pair of digital camera assemblies 70 positioned adjacent the top corners of the touch surface 60. Those of skill in the art will appreciate that additional camera assemblies 70 may be disposed about the periphery of the touch surface 60, especially when the touch surface is very large as described in aforementioned U.S. patent Ser. No. 10/750,219 to Hill et al.

As will be appreciated by those of skill in the art, the pointer may be a finger, a passive or active stylus or other object, a spot of light or other radiation or other indicator that can be seen by the cameras. Although the touch system is described as including digital cameras, other imaging devices such as for example linear optical sensors that are capable of generating an image may be employed.

In the embodiments described above, pointer contacts made on a touch surface are detected and tracked. Those of skill in the art will appreciate that a touch surface is not required and that pointers intersecting a two-dimensional plane or within a three-dimensional volume that is viewed by the imaging devices may be detected and tracked.

Although embodiments have been described above, those of skill in the art will also appreciate that variations and modifications may be made without departing from the spirit and scope thereof as defined by the appended claims.

What is claimed is:

1. An interactive input system comprising:
   imaging devices with different viewpoints and having at least partially overlapping fields of view of a touch surface, at least one of the imaging devices comprising first and second adjacent image sensors with different focal lengths, the first image sensor having a field of view encompassing generally the entirety of the touch surface and the second image sensor having a field of view encompassing only a portion of the touch surface; and
   processing structure configured to process image data acquired by the imaging devices to determine if a pointer image exists in the image data with a desired level of confidence and generate pointer data,
   wherein for each of said at least one imaging devices having said first and second adjacent image sensors with different focal lengths, said processing structure configured to generate the pointer data using image data acquired by only one of said first and second adjacent image sensors and to determine the location of a pointer on the touch surface based on the pointer data,
   wherein for each pointer contact with said touch surface at a location that is proximate the at least one imaging device, the pointer image is determined to exist in the image data with the desired level of confidence in only image data acquired by the first image sensor, and
   wherein for each pointer contact with said touch surface that is distant from the at least one imaging device, the pointer image is determined to exist in the image data with the desired level of confidence in only image data acquired by the second image sensor.

2. The interactive input system according to claim 1 wherein all of said imaging devices comprise first and second adjacent image sensors with different focal lengths.

3. The interactive input system according to claim 2 wherein the first and second adjacent image sensors are vertically stacked so that their optical axes are in line.

4. The interactive input system according to claim 2 wherein the first and second adjacent image sensors are side-by-side.

5. The interactive input system according to claim 2 wherein the imaging devices are positioned adjacent respective corners of the touch surface, the imaging devices looking generally across said touch surface.

6. The interactive input system according to claim 1 wherein the imaging devices are positioned adjacent respective corners of the touch surface, the imaging devices looking generally across said touch surface.

7. The interactive input system according to claim 1 wherein said desired level of confidence is existence of a pointer image having a size greater than a threshold size.

8. A touch system comprising:
   a touch surface on which an image is visible;

imaging assemblies about the periphery of said touch surface, said imaging assemblies having at least partially overlapping fields of view encompassing said touch surface, each imaging assembly comprising at least two proximate imaging devices with each imaging device having a different focal length, a first of said two proximate imaging devices having a field of view encompassing the entirety of said touch surface and a second of said two proximate imaging devices having a field of view encompassing only a portion of said touch surface; and processing structure configured to process image data generated by the imaging assemblies to determine the location of at least one pointer relative to the touch surface based on image data acquired by the imaging assemblies, wherein each imaging assembly generates said pointer data using image data acquired by only one of the first and second imaging devices thereof, wherein said processing structure is configured to process image data acquired by each imaging device to determine if a pointer image exists in the image data with a desired level of confidence, wherein when the pointer contacts the touch surface proximate a particular imaging assembly, the pointer image is detected with the desired level of confidence in only image data acquired by the first imaging device of the particular imaging assembly, and wherein when the pointer contacts the touch surface distant the particular imaging assembly, the pointer image is detected with the desired level of confidence in only image data acquired by the second imaging device.

9. The touch system according to claim 8 wherein the first and second imaging devices of each imaging assembly are vertically stacked so that their optical axes are in line.

10. The touch system according to claim 8 wherein the first and second imaging devices of each imaging assembly are side-by-side.

11. The touch system according to claim 8 wherein said touch surface is rectangular and wherein imaging assemblies are positioned at least adjacent two opposite corners thereof.

12. An interactive input system comprising:
camera assemblies with different viewpoints and having fields of view encompassing a touch surface, each camera assembly comprising at least first and second adjacent image sensors with the image sensors having different focal lengths, the first image sensor having a field of view encompassing generally the entirety of the touch surface and the second image sensor having a field of view encompassing only a portion of the touch surface; and processing structure configured to process image data received from said camera assemblies to determine the position of at least one pointer relative to said touch surface based on image data acquired by the camera assemblies, wherein the image data provided to the processing structure by each camera assembly is based only on image data acquired by one of the first and second adjacent image sensors thereof, wherein said processing structure processes image data acquired by each image sensor to determine if a pointer image is believed to exist in the image data with a desired level of confidence, wherein when the pointer contacts the touch surface proximate a particular camera assembly, the pointer image is detected with the desired level of confidence in only image data acquired by the first image sensor of the particular camera assembly, and wherein when the pointer contacts the touch surface distant the particular camera assembly, the pointer image is detected with the desired level of confidence in only image data acquired by the second image sensor of the particular camera assembly.

13. The interactive input system according to claim 12 wherein said desired level of confidence is existence of a pointer image having a size greater than a threshold size.

14. The interactive input system according to claim 12 wherein the first and second adjacent image sensors of each camera assembly are vertically stacked so that their optical axes are in line.

15. The interactive input system according to claim 12 wherein the first and second adjacent image sensors of each camera assembly are side-by-side.

16. The interactive input system according to claim 12 wherein the camera assemblies are positioned adjacent corners of the touch surface, the first and second adjacent image sensors of each camera assembly looking generally across said touch surface.

17. An interactive input system comprising:
imaging assemblies at spaced locations about the periphery of a touch surface, said imaging assemblies having at least partially overlapping fields of view encompassing said touch surface and acquiring images looking generally across said touch surface, each imaging assembly comprising at least two proximate imaging devices with each imaging device having a different focal length, a first of said two proximate imaging devices having a field of view encompassing the entirety of said touch surface and a second of said two proximate imaging devices having a field of view encompassing only a portion of said touch surface, image data acquired by said imaging assemblies being processed to determine the location of at least one pointer relative to the touch surface based on the acquired image data, wherein image data acquired by only one of said first and second imaging devices of each imaging assembly is used to determine the location of the pointer, wherein image data acquired by each image device is used to determine if a pointer image is believed to exist in the image data with a desired level of confidence, wherein when the pointer contacts the touch surface proximate a particular imaging assembly, the pointer image is detected with the desired level of confidence in only image data acquired by the first imaging device of the particular imaging assembly, and wherein when the pointer contacts the touch surface distant the particular imaging assembly, the pointer image is detected with the desired level of confidence in only image data acquired by the second imaging device of the particular imaging assembly.

18. The interactive input system according to claim 17 wherein the first and second imaging devices of each imaging assembly are vertically stacked so that their optical axes are in line.

19. The interactive input system according to claim 17 wherein the first and second imaging devices of each imaging assembly are side-by-side.

20. The interactive input system according to claim 17 wherein said touch surface is generally rectangular and wherein imaging assemblies are positioned at least adjacent two corners thereof.

21. The interactive input system according to claim 17 wherein said touch surface is generally rectangular and wherein imaging assemblies are positioned at least adjacent two corners thereof.

22. The interactive input system according to claim 17 wherein the imaging device that best sees the pointer is the imaging device that sees a largest pointer image having a size greater than a threshold size.

23. An interactive input system comprising:

camera assemblies with different viewpoints and having fields of view encompassing a touch surface, each camera assembly comprising at least first and second closely positioned image sensors with the image sensors having different focal lengths and acquiring images of said touch surface, the first image sensor having a field of view encompassing the entirety of the touch surface and the second image sensor having a field of view encompassing only a portion of the touch surface, image data acquired by said camera assemblies being processed to determine the location of at least one pointer relative to the touch surface based on the acquired image data, wherein image data acquired only one of said first and second image sensors of each imaging assembly is used to determine the location of the pointer, wherein image data acquired by each image sensor is used to determine if a pointer image is believed to exist in the image data with a desired level of confidence, wherein when the pointer contacts the touch surface proximate a particular camera assembly, the pointer image is detected with the desired level of confidence in only image data acquired by the first image sensor of the particular camera assembly, and wherein when the pointer contacts the touch surface distant the particular camera assembly, the pointer image is detected with the desired level of confidence in only image data acquired by the second image sensor of the particular camera assembly.

24. The interactive input system according to claim 23 wherein the first and second image sensors of each camera assembly are vertically stacked so that their optical axes are in line.

25. The interactive input system according to claim 23 wherein the first and second image sensors of each camera assembly are side-by-side.

26. The interactive input system according to claim 23 wherein the camera assemblies are positioned adjacent corners of the touch surface, the first and second image sensors of each camera assembly looking generally across said touch surface.

27. An interactive input system comprising:

imaging assemblies with different viewpoints and having fields of view encompassing a touch surface, each imaging assembly comprising at least first and second imaging devices with each imaging device having a different focal length, the first imaging device of each imaging assembly having a focal length encompassing the entirety of the touch surface and the second imaging device of each imaging assembly having a focal length encompassing only a portion of the touch surface, wherein image data acquired only by either the first imaging device or by the second imaging device of each imaging assembly is processed to determine the location of at least one pointer within the region of interest, wherein image data acquired by each imaging device is used to determine if a pointer image is believed to exist in the image data with a desired level of confidence, wherein when a pointer contacts the touch surface proximate a particular imaging assembly, the pointer image is detected with the desired level of confidence in only image data acquired by the first imaging device of the particular imaging assembly, and wherein when the pointer contacts the touch surface distant the particular imaging assembly, the pointer image is detected with the desired level of confidence in only image data acquired by the second imaging device of the particular imaging assembly.

28. The interactive input system according to claim 27 wherein the first and second imaging devices of each imaging assembly are vertically stacked so that their optical axes are in line.

29. The interactive input system according to claim 27 wherein the first and second imaging devices of each imaging assembly are side-by-side.

30. The interactive input system according to claim 27 wherein said region of interest is generally rectangular and wherein said imaging assemblies are positioned at least adjacent two corners thereof.

* * * * *